United States Patent
Juščius

(10) Patent No.: US 11,866,096 B2
(45) Date of Patent: Jan. 9, 2024

(54) SPATIAL AGRICULTURAL VEHICLE FRAME STRUCTURE

(71) Applicant: AUGA GROUP, AB, Vilnius (LT)

(72) Inventor: Kęstutis Juščius, Šiauliai (LT)

(73) Assignee: AUGA GROUP, AB, Vilnius (LT)

( * ) Notice: Subject to any disclaimer, the term of this patent is extended or adjusted under 35 U.S.C. 154(b) by 56 days.

(21) Appl. No.: 17/774,676

(22) PCT Filed: Nov. 6, 2020

(86) PCT No.: PCT/IB2020/060458
§ 371 (c)(1),
(2) Date: May 5, 2022

(87) PCT Pub. No.: WO2021/090257
PCT Pub. Date: May 14, 2021

(65) Prior Publication Data
US 2022/0402554 A1 Dec. 22, 2022

(30) Foreign Application Priority Data
Nov. 8, 2019 (LT) .................. PA 2019 527

(51) Int. Cl.
*B62D 21/18* (2006.01)
*A01B 51/02* (2006.01)
(Continued)

(52) U.S. Cl.
CPC .......... *B62D 21/186* (2013.01); *A01B 51/026* (2013.01); *B62D 21/08* (2013.01); *B62D 21/16* (2013.01)

(58) Field of Classification Search
CPC ...... B62D 21/186; B62D 21/08; B62D 21/16; B62D 21/00; B62D 21/06; B62D 21/12; A01B 51/026
See application file for complete search history.

(56) References Cited

U.S. PATENT DOCUMENTS

| 6,533,348 B1 | 3/2003 | Jaekel et al. |
| 8,517,423 B1 | 8/2013 | Huston et al. |
| 2013/0133271 A1 | 5/2013 | Niedzwiecki |

FOREIGN PATENT DOCUMENTS

| CN | 203920913 U | 11/2014 |
| DE | 102012013907 A1 | 1/2014 |
| WO | 2019145585 A1 | 8/2019 |

OTHER PUBLICATIONS

International Search Report for corresponding Serial No. PCT/IB2020/060458 dated Mar. 2, 2021 (3 pgs).

*Primary Examiner* — Paul N Dickson
*Assistant Examiner* — Matthew Joseph Ganci
(74) *Attorney, Agent, or Firm* — Tutunjian & Bitetto, P.C.

(57) ABSTRACT

A spatial frame structure of a vehicle designed for connecting structural assemblies. The described frame construction allows the use of interchangeable high-capacity fuel tanks. As a result, most structural assemblies are mounted to the outside of the frame, thus creating additional space in which elements of alternative fuel and energy source systems (e.g. natural gas tanks, electric batteries) can be assembled. This makes it possible to increase the working time of the agricultural vehicle. The frame construction comprises rigidly interconnected longitudinal tubular beams, transverse, perpendicular and diagonally arranged structural pipes, additionally connecting stiffness elements. The structure includes fastening elements for connecting the following structural assemblies: rear wheel hubs, which are assembled with electric drives; mechanical implement coupling device; structure of replaceable fuel tanks; door platform; folding driver's cab; chassis steering axle with electric drive; side component containers; power plant; mechanical coupling device for trailers and semi-trailers.

7 Claims, 5 Drawing Sheets

(51) Int. Cl.
*B62D 21/08* (2006.01)
*B62D 21/06* (2006.01)
*B62D 21/16* (2006.01)

SPATIAL AGRICULTURAL VEHICLE FRAME STRUCTURE

FIELD OF THE INVENTION

The invention belongs to the field of production of machines, and more particularly to frame constructions to which structural assemblies of agricultural vehicles are attached.

DESCRIPTION OF RELATED ART

U.S. Pat. No. 6,533,348 B1 (published 2003 Mar. 18) discloses a spatial modular frame construction for a motor vehicle consisting of a body module and a front module. The body module consists of a pair of longitudinal side rail beams connected to the pair by perpendicular profiles at the rear to form a pair of supports. Most of the interconnected profiles are located in the body module to protect the main longitudinal frame beams, the lower frame profiles and said pair of supports. The front module consists of a pair of front lower profiles, a pair of upper profiles and a front connecting profile, designed and arranged to allow profiles of the front lower part and front upper part to be connected to each other in the transverse direction. The front module is rigidly connected to the body module by rigidly connecting each profile of the lower front part to the main longitudinal beams and the profiles of the upper front part to a pair of supports.

U.S. Pat. No. 8,517,423 B1 (published 2013 Aug. 27) describes a modular frame structure for an off-road vehicle. The frame includes identical right side and left side longerons; a front frame module including at least one lower part on the left and right sides; a middle module including at least one lower part on the left and right sides; a rear module, also including at least one lower part on the left and right sides; and a variety of mounting brackets for attaching structural assemblies of a vehicle to the left and right side longerons.

Although both of the above-mentioned patents cover spatial vehicle frame structures, they are not adapted for the mounting of structural assemblies of an agricultural vehicle. Also, the mentioned constructions do not provide for the connection of interchangeable fuel tanks.

The closest invention is provided in the utility model CN203920913U (published 2014 Nov. 5), which describes a tractor frame structure comprising front and rear parts to which the following components are attached: the driver's seat is connected to the front of the frame by pins; the tractor suspension is connected to the lower part of the front frame by wedge pins; main brake pump mounting housing; battery mounting bracket; hydraulic oil tank mounting housing; hydraulic cylinder mounting bracket; suspension connector mounting bracket. The power take-off gearbox mounting housing II and the power take-off gearbox mounting housing I are welded to the rear frame structure by arranging said mounting elements from the front to the rear, respectively; The mounting elements for the power take-off gearboxes are located at the end of the rear frame structure. The construction of the tractor frame is simple, rigid, characterized by a simple production and assembly process. The position of the attachment of the tractor units to the frame structure can be optimally arranged, the front part can be expanded by integrating more functions, and the rear part can be adapted to the coupling of mechanical implements. Although the presented frame construction allows mounting many structural assemblies, it does not provide for the mounting of a replaceable fuel tank structure. This significantly limits the design's suitability for composing elements of alternative fuel and energy source systems (e.g. natural gas tanks, electric batteries, etc.) to reduce greenhouse gas emissions in the agricultural sector, and ensure operational autonomy without recharging the energy source.

SUMMARY OF THE INVENTION

This description describes the spatial frame structure of an agricultural vehicle for connecting structural assemblies. The frame structure has: upper, middle and lower horizontal structures consisting of rigidly interconnected longitudinal beams, transverse and diagonally arranged structural pipes and stiffening elements. Upper, middle and horizontal structures are interconnected by perpendicular and diagonal pipes and an additional stiffening element. The presented frame construction allows to connect the following assemblies of agricultural vehicles: rear wheel hubs, assembled with electric drives; mechanical implement coupling device; construction of replaceable fuel tanks; door platform; folding driver's cab; chassis front steered axle with electric drive; side component containers; power plant; mechanical coupling device for trailers and semi trailers.

The described construction of the agricultural vehicle frame differs from the analogues in that it allows the use of interchangeable high-capacity fuel tanks. As a result, most components are connected to the outside of the frame, thus creating additional space in which elements of alternative fuel and energy source systems (e.g. natural gas tanks, electric batteries, etc.) can be arranged. This makes it possible to increase the working time of the agricultural vehicle. In addition, the narrower front part of the frame, which mounts the chassis' front-wheel drive with electric drive, provides a high steering angle, increasing maneuverability of an agricultural vehicle, and attaching the rear wheel hubs to the frame by replacing the rear chassis axle allows for increased volume of the fuel space. Also, the fasteners in the frame structure allow the mounting of the folding driver's cab in the upper part of the frame, thus ensuring quick and convenient access to the power plant compartment and other front components.

The illustrations provided are more illustrative in nature, scale, proportions and other aspects do not necessarily correspond to a real technical solution.

DETAILED DESCRIPTION OF THE EMBODIMENTS

Figure 1:
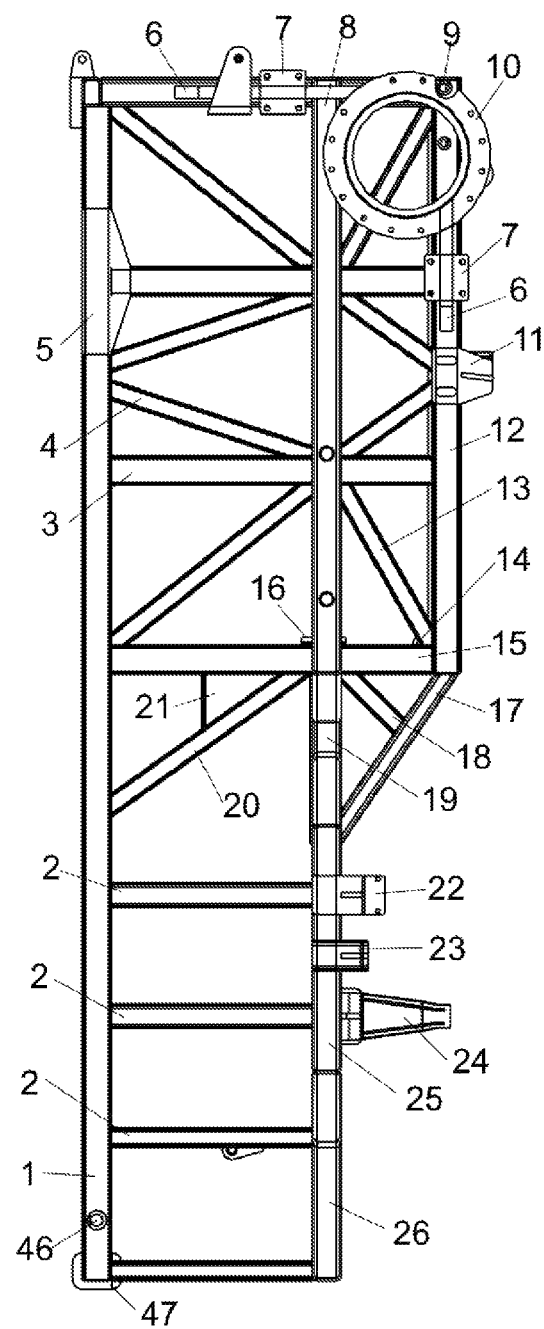
FIG. 1. Front view of the spatial frame structure.
Figure 2:
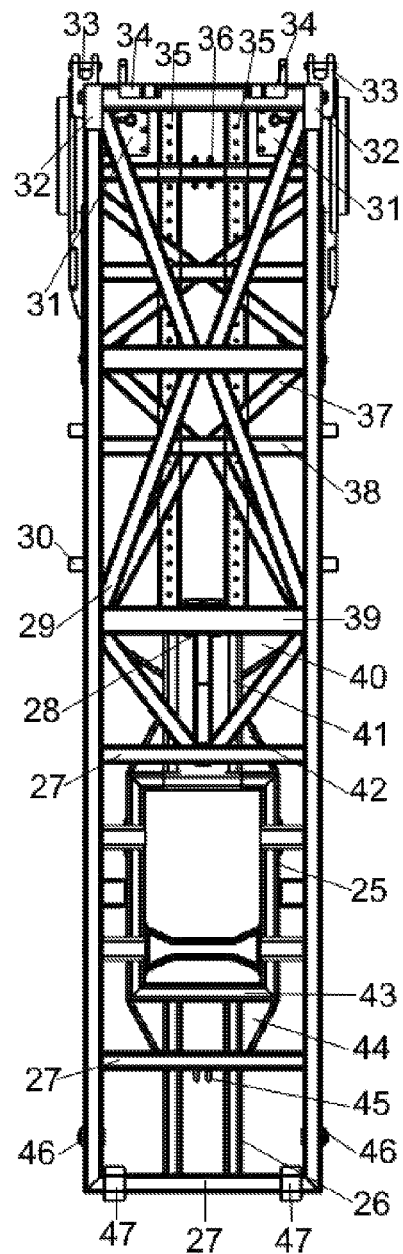
FIG. 2. Top view of the spatial frame structure.

At present, the description provides a spatial method of attachment (arrangement) of the structure of agricultural vehicles and the assemblies connected to it. The upper horizontal structure of the spatial frame (FIG. 1, 2) consists of two longitudinal beams of the tubular profile (1), which are connected by transverse directional arrangement of structural pipes (27) of equal length. The structural elements of the upper horizontal structure (1, 27) are rigidly connected by diagonally arranged structural pipes (29). The middle horizontal structure of the spatial frame consists of two parts: rigid part and tapered part. The rigid part is parallel to the upper and lower horizontal structures and consists of two longitudinal tubular beams (8), the front part of which is rigidly connected by a structural pipe (39) arranged in the transverse direction. The tapered part consists of rigidly interconnected structural pipes arranged in the longitudinal (25, 26) and transverse (43) directions, which are additionally connected by stiffening elements (44) on both sides of the tapered part. The rigid and tapered parts are mutually rigidly joined by two longitudinally arranged tubular profile beams (19), in addition to which pairs of stiffening elements (40, 42) are connected, which are also connected to the front transverse pipe (39) of the rigid part and the rear transverse pipe (43) of the tapered part. The front transverse pipe (39) of the rigid part, the longitudinal beams (19) and the rear transverse pipe (43) of the tapered part are additionally rigidly joined by a plate (41), which is mounted horizontally at the top of said elements. The lower horizontal structure of the spatial frame consists of a pair of longitudinal tubular profile beams (12) rigidly connected to each other by structural tubes (38) arranged in the transverse direction. The longitudinal beams (12) are additionally connected to the transverse pipes by diagonally arranged structural pipes (37), to which the beam segments are connected in the longitudinal direction.

The upper horizontal structure is rigidly connected to the middle horizontal structure by perpendicularly (3) and diagonally (4) arranged structural pipes. Additionally, a pair of stiffening plates (5) is rigidly connected on both sides of the frame. The tapered part of the middle horizontal structure is rigidly connected to the upper horizontal structure by pipes (2) inclined towards the inside of the frame. One of the pairs of tubes (2), spaced through one pair of tubes from the front part of the frame, is connected by a transverse structural pipe, at the top of which, in the middle, a cylinder mounting lug (45) is rigidly attached. The transverse pipe (27) of the upper horizontal structure is additionally connected by a diagonally arranged structural pipe (20) to the vertical middle pipe, to which the horizontal transverse pipe (27) of the horizontal upper structure and the front transverse pipe (39) of the rigid part of the middle structure are connected. The diagonally connected pipe (20) is additionally connected to the vertical pipe by a stiffening element (21). The vertical pipe is connected to a pair of vertically arranged front pipes of the rigid part of the middle horizontal structure by transverse structural pipes.

The lower horizontal structure is rigidly connected to the middle horizontal structure by structural pipes arranged perpendicularly (15) and diagonally (13) on both sides. The transverse front pipe (38) of the lower horizontal structure is connected to the rear transverse pipe (43) of the tapering part of the middle horizontal structure by a pair of diagonally arranged structural pipes (17), to which another pair of diagonally arranged pipes (18) joined to the front transverse pipe (39) of the rigid part of the middle horizontal structure is attached. The front transverse pipe (38) of the lower horizontal structure in the middle part is connected by a structural pipe in the vertical direction to the middle part of the front transverse pipe (39) of the rigid part of the middle horizontal structure.

By joining the horizontal upper, middle and lower structures by perpendicularly and diagonally arranged structural pipes, a spatial frame structure is obtained, to which standard and non-standard structural assemblies of agricultural vehicles are attached. Non-standard structural assemblies:
 rear-wheel hubs assembled with electric drives;
 mechanical implement coupling device;
 structure of replaceable fuel tanks;
 door platform;
 folding driver's cab.
Standard Structural Assemblies:
 chassis front steered axle with electric drive;
 side component containers;
 power plant (e.g. internal combustion engine, electric generator);
 mechanical coupling device for trailers and semi-trailers.
Connection of Non-Standard Structural Assemblies to the Frame Structure.

Figure 3:
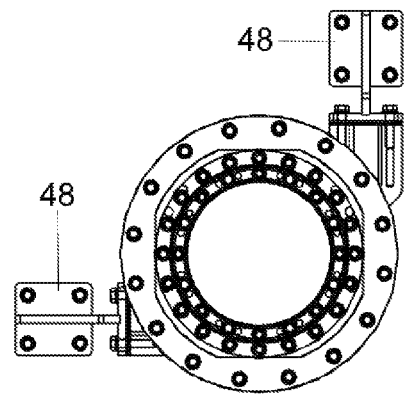
FIG. 3. Front view of the rear wheel hub attached to the frame structure.

The rear wheel (FIG. 3) hubs, together with the internal electric drives, are mounted on both sides of the rear part of the frame structure. For that purpose, brackets (6) with inserted flanges (10) are attached to the longitudinal beams (12) of the lower horizontal frame structure and to the vertical rear pipes (3, 15) connecting the lower, middle and upper structures. The mounting plates (7) to which the hub holders (48) are attached, after the hub has been attached to the flange (10), are also attached to the brackets (6).

Figure 4:
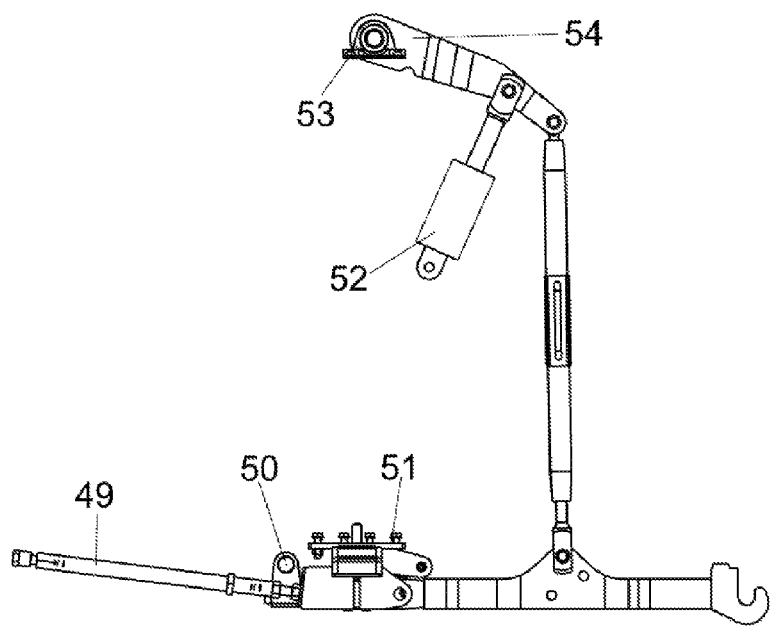
FIG. 4. Front view of the implement coupling device attached to the frame structure.

The implement coupling device (FIG. 4) is mounted to the frame structure at the rear. The lower part of the coupling device (51) is attached to the mounting plates (31) connected by bushings (9) to the longitudinal beams (12) of the lower horizontal frame structure. The lower part of the coupling device (51) is also fastened to the frame by means of adjustable levers (49) which are attached to the mounting plates (11) rigidly connected to the longitudinal beams (12) of the lower horizontal structure of the frame. The lower part of the coupling device (51) is additionally connected by a plate (50) attached to the lug (36), which is attached to the middle of the lower transverse beam (38) of the lower horizontal frame structure. The upper part of the coupling device (54) is connected by a pair of bearing beds (53), which are attached to the fastening elements (32) of the upper part of the frame by inserting additional plates for height adjustment between them. The implement coupling device is attached to the frame by hydraulic cylinders (52), which are connected to the frame by brackets (33) with lugs. The holders (33) of the hydraulic cylinders (52) are connected to the vertical rear pipes (3) and the vertical holders (6) of the flanges (10) enclosing them.

Figure 5:
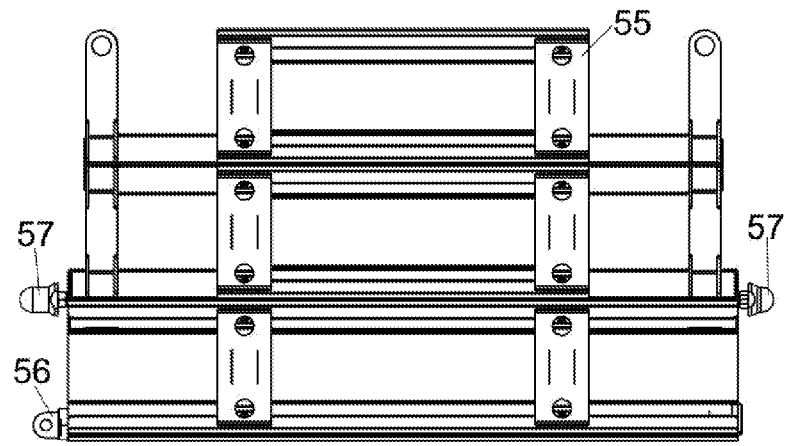
FIG. 5. Front view of interchangeable fuel tanks attached to the frame structure.

Combining the upper, middle and lower horizontal structures of the frame provides additional space at the rear for connection of the interchangeable fuel tanks (FIG. 5) to the structure. The structure of the fuel tanks comprises: a support platform (55); a lower hydraulic cylinder (56) connected to the platform (55) and connected to a support lug (14) which is rigidly attached to the transverse pipe (38) of the lower horizontal frame structure and the connecting vertical pipe. The support platform (55) is attached to the lower part of the platform by means of guides (35) inside the frame. The guides (35) are attached to the longitudinal beam segments of the lower horizontal frame structure. This ensures reciprocating motion of the support platform (55) in the longitudinal direction and good access to the fuel tanks during maintenance, repair or replacement of the tanks. The support platform (55), moving in the longitudinal direction and reaching the end position, rests with a clamper (57) against a flange (16) connected to a clamp (28), which is attached to the transverse (39) and the longitudinal frame pipes enclosing them.

Figure 6:
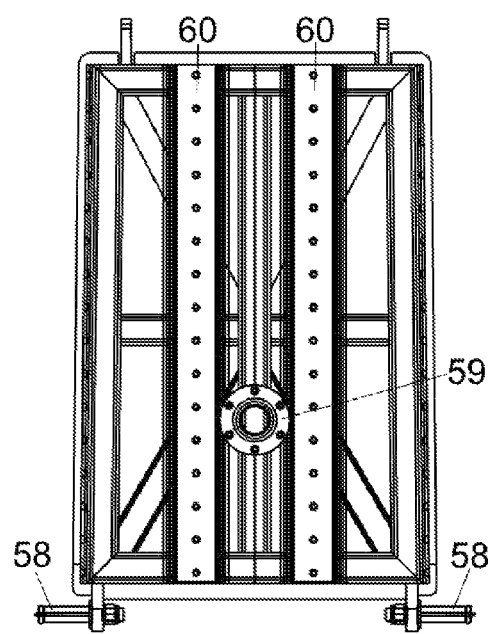
FIG. 6. Front view of a door platform attached to the frame structure.

The door platform (FIG. 6) is attached to the lower horizontal frame structure by longitudinal beams (12) by hinges (58). A flange (59) is mounted on the platform, on which the fuel tank support platform (55) is resting by means of a clamper (57). Guides (60) moving the structure of the fuel tanks, when opened, are also attached to the door. A two-way cylinder, which is attached to the rear transverse pipe (27) of the upper horizontal frame structure and brackets with lugs (34) connected to said pipe (27), is used to lock the door in a vertical position.

Figure 7:
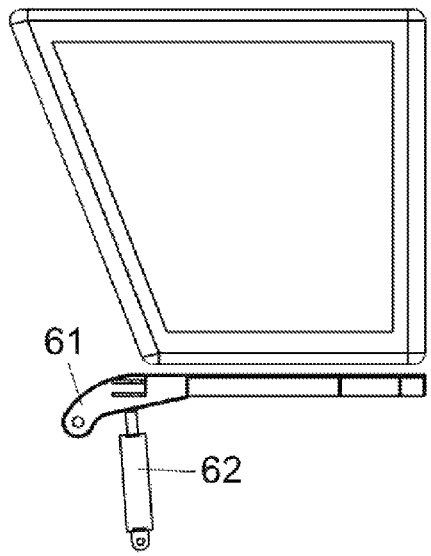
FIG. 7. Front view of a driver's cab attached to the frame structure.

The folding driver's cab (FIG. 7) is mounted at the upper part of the frame structure. The driver's cab is secured with brackets (61), which are connected to the longitudinal beams (1) of the upper horizontal frame structure by means of bushings (46) and standard pins. The hydraulic cylinder (62) connected to the front middle part of the driver's cab, is attached by means of the mounting lug (45) rigidly attached to the transverse pipe. This ensures the cab's rotary movement around the axis of the bushings (46) as the cylinder (62) raises the cab to the upper position. The cab, when tilted to its maximum position, rests against protective elements (47) attached to the front transverse pipe (27) of the upper horizontal frame structure and protecting the frame structure from the impact of the cab as it moves. Foldable driver's cab ensures good accessibility for maintenance or repair of structural assemblies. The space under the cab can be adapted for transporting repair tools, spare parts or other items.

Connection of Standard Structural Assemblies to the Frame Structure.

Chassis front steering axle with electric drive is connected to the frame by the axle beams (24) of the tapered part of the horizontal middle structure. The front axle beam is rigidly attached to the longitudinal beams (25) of the tapered part, and the rear axle beam is attached to the mounting plates (22) rigidly attached to the longitudinal frame beams (25). The mounting lugs (23) of the bridge locking mechanism are also rigidly connected to the longitudinal beams (25) of the frame. The tapered part of the middle horizontal structure of the frame ensures a high steering angle (up to 30°) of the steering wheels of the agricultural vehicle mounted on the front axle hubs.

Figure 8:
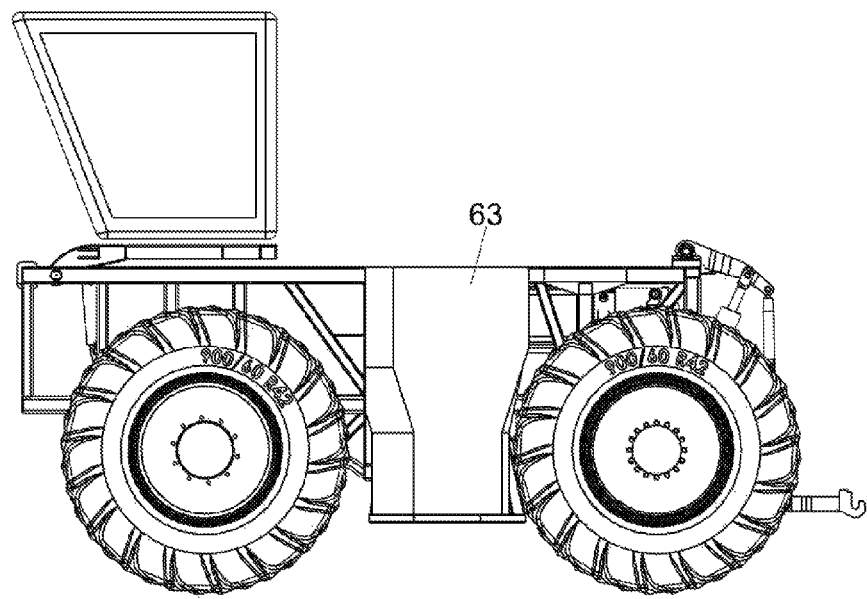
FIG. 8. Front view of an agricultural vehicle with assemblies attached to the frame structure.

An additional frame structure (FIG. 8) is connected to the frame structure, on the sides of said additional frame structure component tanks (63) are attached for the arrangement of the elements of electric drives and hydraulic equipment. The additional structure consisting of rigidly connected structural pipes is attached by bushings (30).

The power plant (e.g. internal combustion engine, electric generator) is mounted on the front spatial part of the frame structure, underneath the foldable driver's cab.

The rear upper part of the frame structure is intended to be fitted with a standard coupling device for trailers and semi-trailers.

The described frame construction, compared with the closest analogue, is more suitable for the use of interchangeable high-capacity fuel tanks mounted on the inside of the agricultural vehicle frame construction.

In order to illustrate and describe the present invention, a description of the most preferred embodiments is provided above. It is not an exhaustive or restrictive description intended to determine the exact form or embodiment. The above description should be considered as an illustration rather than as a limitation. Obviously, many modifications and variations can be apparent to those skilled in the art. An embodiment is selected and described so that those skilled in the art can best understand the principles of the present invention and their best practice for different embodiments with different modifications to suit a particular use or implementation. It is intended that the scope of the invention be defined by the definition appended thereto and its equivalents, in which all the above terms have the broadest meaning, unless otherwise indicated.

Embodiments described by those skilled in the art may be modified without departing from the scope of the present invention as defined below.

The invention claimed is:

1. A spatial frame structure of an agricultural vehicle to which structural assemblies are attached, comprising:
   an upper horizontal structure consisting of rigidly connected longitudinal tubular beams, transverse and diagonally arranged structural pipes;
   a middle horizontal structure, the front part of which is tapered, consisting of rigidly connected longitudinal tubular beams, transverse structural pipes and stiffening elements;
   a lower horizontal structure consisting of longitudinal tubular beams, transverse and diagonally arranged structural pipes,
   wherein the upper, middle and lower horizontal structures are rigidly mutually joined by structural pipes arranged perpendicularly and diagonally by additionally connecting a stiffening element and connecting one pair of pipes by a transverse pipe,
   wherein the spatial frame structure contains interchangeable high-capacity fuel tanks intended for the operation of an agricultural vehicle.

2. The spatial frame structure of an agricultural vehicle according to claim 1, wherein the rear wheel hub brackets are attached to mounting plates connected to brackets attached to the longitudinal beams and to the perpendicular rear pipes into which flanges are inserted for connecting said wheel hubs.

3. The spatial frame structure of an agricultural vehicle according to claim 1, wherein the lower part of the mechanical implement coupling device is connected to mounting plates fastened to the frame's longitudinal beams by adjustable levers connected to mounting plates that are rigidly attached to the lower beams of the frame and an additional plate joined to the lug connected to the middle of the rear transverse beam; the upper part of the coupling device is connected by a pair of bearing beds, which are joined to the frame structure by fastening elements, and hydraulic cylinders connected to brackets attached to the rear pipes and brackets.

4. The spatial frame structure of an agricultural vehicle according to claim 1, wherein the platform of the interchangeable fuel tanks is connected by guides, which are connected to the fragments of longitudinal beams of the lower horizontal frame structure, and a hydraulic cylinders connected to the retaining lug, rigidly attached to the transverse pipe the lower horizontal frame structure and the connecting vertical tube, and as the tank structure moves following the guides of the frame and the door platform; the tank structure by means of a clamper rests against a flange connected to a clamp, which is attached to the transverse and longitudinal pipes of the frame.

5. The spatial frame structure of an agricultural vehicle according to claim 1, wherein the door platform is connected to the longitudinal beams by hinges and fixed in a vertical position by a bidirectional hydraulic cylinder connected to the rear transverse pipe of the upper horizontal frame structure and by brackets with lugs, and the fuel tank platform rests by a clamp against the flange of the door platform.

6. The spatial frame structure of an agricultural vehicle according to claim 1, wherein the driver's cab is connected to the outer upper part of the frame structure by brackets and a hydraulic cylinder connected to the mounting lug, which is rigidly connected to the transverse pipe, and when the maximum folding position of the cab is reached, it rests against the protective elements mounted on the transverse pipe.

7. The spatial frame structure of an agricultural vehicle according to claim 1, wherein the following standard structural assemblies are connected to it:
- the front steering axle of the chassis with an electric drive is connected by the axle beams, one of which is rigidly attached to the frame structure and the other—to the mounting plates;
- side component containers mounted on an additional frame structure are connected to the spatial frame structure by bushings;
- the power plant is mounted on the front spatial part of the frame structure, underneath a folding driver's cab;
- coupling device for trailers and semi-trailers is attached to the rear upper part of the frame structure.

* * * * *